United States Patent
Siripunkaw et al.

(10) Patent No.: US 7,839,870 B2
(45) Date of Patent: Nov. 23, 2010

(54) DEVICE-TO-DEVICE COMMUNICATION AMONG CUSTOMER PREMISE EQUIPMENT DEVICES

(75) Inventors: Pak Siripunkaw, Sicklerville, NJ (US); Emery J. Weber, Denver, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 483 days.

(21) Appl. No.: 11/603,422

(22) Filed: Nov. 22, 2006

(65) Prior Publication Data

US 2007/0177614 A1   Aug. 2, 2007

Related U.S. Application Data

(60) Provisional application No. 60/739,472, filed on Nov. 23, 2005, provisional application No. 60/791,803, filed on Apr. 13, 2006.

(51) Int. Cl.
*H04L 12/28* (2006.01)
*G06F 15/177* (2006.01)

(52) U.S. Cl. ............... 370/401; 370/235; 370/254; 370/389; 370/392; 709/217; 709/220; 709/223

(58) Field of Classification Search ......... 370/235–485; 709/202–223; 455/450
See application file for complete search history.

(56) References Cited

U.S. PATENT DOCUMENTS

| | | | | |
|---|---|---|---|---|
| 6,308,289 | B1 * | 10/2001 | Ahrens et al. ............. | 714/48 |
| 6,501,750 | B1 * | 12/2002 | Shaffer et al. ............ | 370/352 |
| 6,560,203 | B1 * | 5/2003 | Beser et al. .............. | 370/252 |
| 6,690,655 | B1 * | 2/2004 | Miner et al. .............. | 370/278 |
| 6,715,075 | B1 * | 3/2004 | Loukianov ............... | 713/176 |
| 6,831,921 | B2 * | 12/2004 | Higgins .................... | 370/401 |
| 6,917,675 | B2 * | 7/2005 | Lazarus et al. ......... | 379/202.01 |
| 6,952,428 | B1 * | 10/2005 | Necka et al. ............ | 370/466 |
| 7,039,432 | B2 * | 5/2006 | Strater et al. ........... | 455/501 |
| 7,058,055 | B2 * | 6/2006 | Mugica et al. .......... | 370/392 |
| 7,085,814 | B1 * | 8/2006 | Gandhi et al. .......... | 709/208 |
| 7,285,090 | B2 * | 10/2007 | Stivoric et al. ......... | 600/300 |
| 7,293,078 | B2 * | 11/2007 | Danforth ................. | 709/222 |
| 7,293,282 | B2 * | 11/2007 | Danforth et al. ........ | 726/4 |
| 7,334,258 | B1 * | 2/2008 | Ford et al. .............. | 726/4 |
| 7,337,217 | B2 * | 2/2008 | Wang ...................... | 709/217 |
| 7,415,603 | B2 * | 8/2008 | Woundy et al. ......... | 713/1 |
| 7,443,883 | B2 * | 10/2008 | Seiden .................... | 370/468 |
| 7,539,193 | B2 * | 5/2009 | Pfeffer et al. ........... | 370/392 |
| 7,600,003 | B1 * | 10/2009 | Okmianski et al. ..... | 709/220 |

(Continued)

*Primary Examiner*—Ayaz R Sheikh
*Assistant Examiner*—Venkatesh Haliyur
(74) *Attorney, Agent, or Firm*—Banner & Witcoff, Ltd

(57) ABSTRACT

A method of initializing, provisioning, and managing a cable modem and a customer premise equipment device includes sending a customized configuration file to the cable modem. The configuration file contains service provisioning information and further includes information indicative of a device-to-device communication configuration. A message is passed from the cable modem to the customer premise equipment device indicative of the device-to-device communication configuration. The customer premise equipment device is initialized for device-to-device communication with any other customer premise equipment devices in accordance with the device-to-device communication configuration indicated in the message, which relates to physical layer and data link layer communications among customer premise equipment devices. In this way, the customer premise equipment device knows how to communicate with other customer premise equipment devices, for example, at the same subscriber location.

12 Claims, 2 Drawing Sheets

U.S. PATENT DOCUMENTS

| | | | |
|---|---|---|---|
| 7,617,517 B2 * | 11/2009 | Kay | 725/111 |
| 7,647,617 B2 * | 1/2010 | Bartfeld et al. | 725/122 |
| 7,693,171 B2 * | 4/2010 | Gould | 370/432 |
| 2001/0038690 A1 * | 11/2001 | Palmer et al. | 379/218.01 |
| 2002/0061012 A1 * | 5/2002 | Thi et al. | 370/352 |
| 2004/0024912 A1 * | 2/2004 | Fukao et al. | 709/249 |
| 2004/0177133 A1 * | 9/2004 | Harrison et al. | 709/220 |
| 2005/0246757 A1 * | 11/2005 | Relan et al. | 725/135 |
| 2006/0031921 A1 * | 2/2006 | Danforth et al. | 726/1 |
| 2006/0159100 A1 * | 7/2006 | Droms et al. | 370/395.2 |
| 2006/0256799 A1 * | 11/2006 | Eng | 370/401 |
| 2006/0271772 A1 * | 11/2006 | Woundy et al. | 713/1 |
| 2006/0271946 A1 * | 11/2006 | Woundy et al. | 725/9 |
| 2006/0285544 A1 * | 12/2006 | Taylor et al. | 370/401 |
| 2007/0174471 A1 * | 7/2007 | Van Rossum | 709/229 |
| 2007/0177526 A1 * | 8/2007 | Siripunkaw et al. | 370/254 |
| 2007/0180484 A1 * | 8/2007 | Siripunkaw et al. | 725/111 |

* cited by examiner

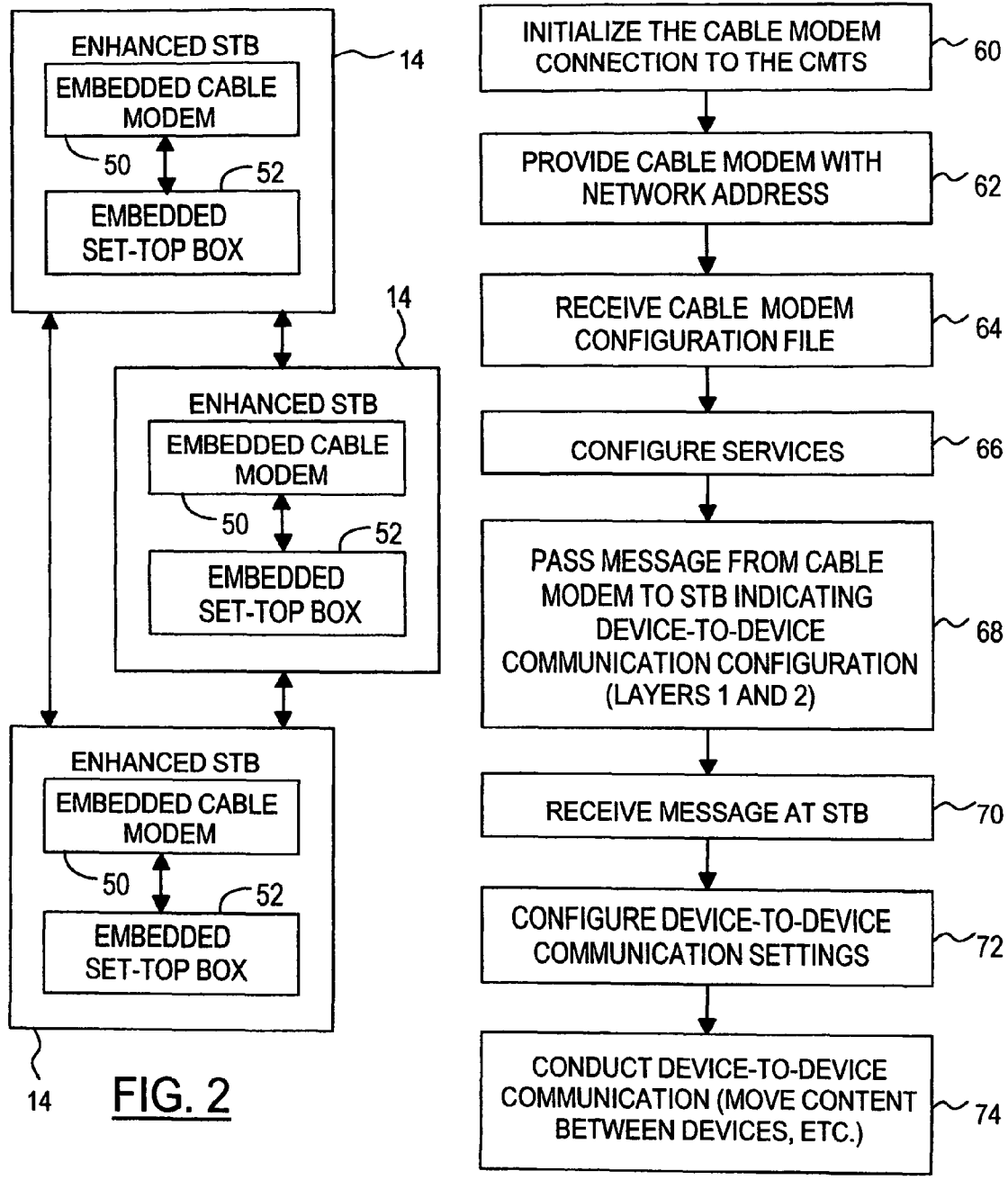

DEVICE-TO-DEVICE COMMUNICATION AMONG CUSTOMER PREMISE EQUIPMENT DEVICES

CROSS-REFERENCE TO RELATED APPLICATIONS

This application claims the benefit of U.S. provisional application Ser. No. 60/739,472, filed on Nov. 23, 2005, which is hereby incorporated by reference. This application claims the benefit of U.S. provisional application Ser. No. 60/791,803, filed on Apr. 13, 2006, which is hereby incorporated by reference.

BACKGROUND OF THE INVENTION

1. Field of the Invention

The invention relates to a method of initializing, provisioning, and managing a cable modem and a customer premise equipment device. The invention further relates to device-to-device communication among customer premise equipment devices.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application, the cable modem can obtain an IP address in a known manner, and customer premise equipment connected to the HFC network through the cable modem may obtain an IP address, for example, by utilizing DHCP.

A subscriber location may have multiple customer premise equipment devices. For example, the subscriber location may have multiple set-top boxes. It may be desirable to allow device-to-device communication among the set-top boxes within the subscriber location. However, configuring the set-top boxes for this communication may be difficult. For example, in a situation where there are a plurality of cable modem/set-top box pairs within a subscriber residence, traditional approaches may be used to connect each set-top box to the head end. However, in order to allow device-to-device communication among the set-top boxes in the residence, the devices must be configured. Although existing specifications provide for the configuration of communications with the head end, the devices are configured independently without any provision for device-to-device communication within the residence.

For the foregoing reasons, there is a need for a method of initializing, provisioning, and managing a cable modem and a customer premise equipment device in which the customer premise equipment device is informed as to the proper device-to-device communication configuration for communications among customer premise equipment devices, for example, at the same subscriber location.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In accordance with the invention, the method further comprises passing a message from the cable modem to the customer premise equipment device indicative of a device-to-device communication configuration. According to the invention, the configuration file, in addition to containing service provisioning information, further includes information indicative of a device-to-device communication configuration. This further information may be included in a number of custom fields in the configuration file. Adding these custom fields to the configuration file as contemplated by the invention allows the configuration file to indicate the device-to-device communication configuration for the customer premise equipment device. The customer premise equipment device receives the message passed from the cable modem, and is initialized for device-to-device communication with any other customer premise equipment devices in accordance with the device-to-device communication configuration indicated in the message. This specified device-to-device communication configuration relates to physical layer and data link layer communications among customer premise equipment devices.

At the more detailed level, the invention comprehends additional features. In one aspect, the customer premise equipment device is a set-top box. The device-to-device communication configuration relates to physical layer and data link layer communications among set-top boxes. For example, the cable modem connection to the CMTS is initialized in any suitable way; however, the configuration file sent to the cable modem further includes information indicative of the device-to-device communication configuration, and this information is passed in a message from the cable modem to the set-top box. The configuration relates to physical layer and data link layer communications, and may include information such as a specified radio frequency for the device-to-device communications. The set-top box and the cable modem may be both embedded in a subscriber gateway.

In preferred embodiments of the invention, the cable modem has a hardware address, for example, a media access control (MAC) address. The device-to-device communication configuration indicated by information in the configuration file sent from the network server is based at least in part on the hardware address of the cable modem. That is, configuration files may be customized on a per-modem basis. For example, set-top boxes located at the same subscriber location may be given a common physical layer and data link layer configuration for device-to-device communications.

BRIEF DESCRIPTION OF THE DRAWINGS

FIG. 2 illustrates multiple enhanced set-top boxes at a subscriber location, showing an embedded cable modem and embedded set-top box in each enhanced set-top box; and FIG. 3 illustrates initializing, provisioning, and managing a cable modem and a customer premise equipment device in the preferred embodiment of the invention.

DETAILED DESCRIPTION OF THE PREFERRED EMBODIMENT

Figure 1:
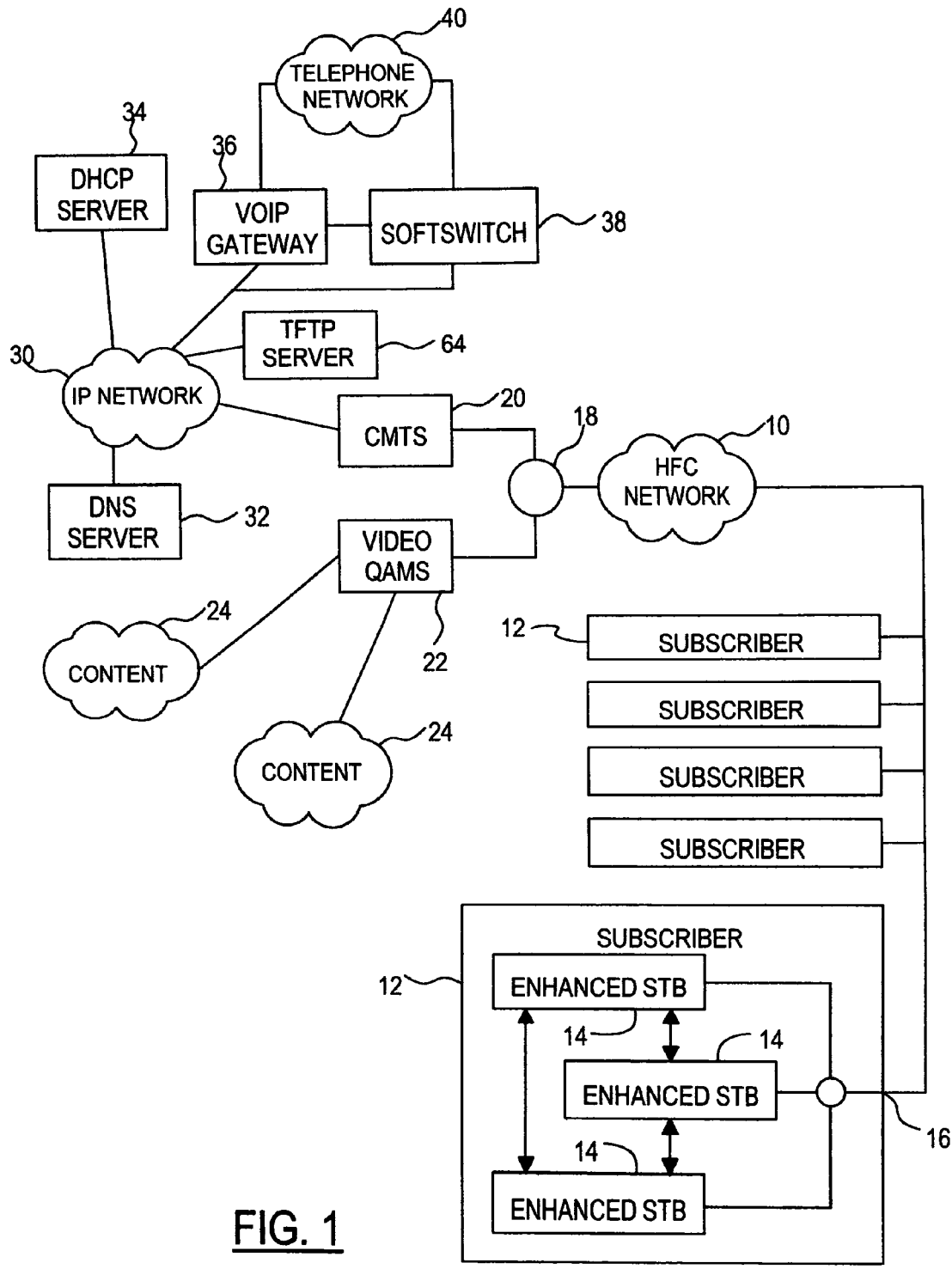
FIG. 1 illustrates a network diagram in accordance with a preferred embodiment of the invention.

In FIG. 1, the hybrid fiber coax (HFC) network 10 provides service to a plurality of subscribers 12. Each subscriber 12 has one or more enhanced set-top boxes 14. An enhanced set-top box functions as a subscriber gateway, and includes an embedded cable modem 50 and an embedded set-top box 52 as shown in FIG. 2. The head end equipment includes cable modem termination system (CMTS) 20 and a plurality of video quadrature amplitude modulation (QAM) systems 22. Connector 18 illustrates the distribution of content from QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. In FIG. 1, CMTS 20 connects to the provider Internet protocol (IP) network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also illustrated is trivial file transfer protocol (TFTP) server 64 which serves the configuration files.

With reference to FIGS. 1-3, a preferred embodiment of initializing, provisioning, and managing a cable modem and a customer premise equipment device is illustrated. The customer premise equipment device is depicted as an embedded set-top box 52, but may take other forms.

At block 60, the cable modem connection to the CMTS 20 is initialized. At block 62, the cable modem 50 is provided with a network address. In more detail, the cable modem is initialized and provisioned using a suitable technique such as known DOCSIS techniques. At block 64, the cable modem 50 receives the cable modem configuration file, for example, from trivial file transfer protocol (TFTP) server 64. At block 66, services are configured. At this point, the cable modem 50 has completed initialization, and is a manageable network element in the operator's IP network. This initialization process takes place for each cable modem at the subscriber location, and in the case of enhanced set-top boxes, this process takes place for each embedded cable modem.

Generally, the initializing and provisioning may take place according to DOCSIS standards or any other suitable approach involving a downloadable configuration file; however, in accordance with the invention, the configuration file sent to the cable modem includes service provisioning information and further includes information indicative of a device-to-device communication configuration for the embedded set-top box 52 (or other CPE device). More specifically, the device-to-device communication configuration relates to physical layer and data link layer communications among embedded set-top boxes 52 (or other CPE devices).

For example, the communication configuration may include information such as the electrical specification of signals (for example, frequency and coding) and frame structure for transferring frames from one host to another. The inclusion of this device-to-device communication configuration information in the configuration file is a customization to the configuration file in accordance with the invention that has many advantages. This customization may take place by, for example, adding custom fields to the configuration file. According to the invention, cable modem 50 passes a message to the set-top box 52 indicating the configuration. The message passing is indicated at block 68 in FIG. 2, which specifies that the configuration relates to layers 1 and 2 (physical and data link layers). The message passing may take any appropriate form. For example, a direct, dedicated connection between embedded cable modem 50 and embedded set-top box 52 may be used for the message passing. Depending on the application, other approaches may be appropriate, for example, when the CPE device is something other than an embedded set-top box.

At block 70, the message is received, and at block 72, the communication settings of the set-top box are configured.

It is appreciated that the invention, by customizing the configuration file, provides a way for the embedded set-top box or other CPE device behind the cable modem to be configured for device-to-device communication among other customer premise equipment devices or set-top boxes, particularly, at the same subscriber location.

At block 74, device-to-device communication is conducted, and includes moving content between devices. For example, video programming stored on one set-top box may be moved to another set-top box within the subscriber location.

In the exemplary embodiment of the invention, for each cable modem/CPE device pair, the communication configuration for the CPE device is related to the hardware address of the cable modem by the provider. Accordingly, the configuration file sent to a particular cable modem indicates the appropriate device-to-device communication configuration for the CPE device paired with the particular cable modem.

As best shown in FIG. 1, further steps may be taken to block upstream traffic toward the CMTS 20 with a filter 16. For example, a physical layer filter may be configured to block upstream traffic toward the CMTS 20 from the set-top boxes during device-to-device communications. Further, for example, a data link layer filter may be configured to block upstream traffic toward the CMTS 20 from the set-top boxes during device-to-device communication.

It is appreciated that embodiments of the invention may involve any suitable underlying initializing and provisioning technique, with a customized configuration file. Further, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modem configuration method, comprising:
   receiving, at a customer premise modem, a configuration file from a network server, wherein the configuration file includes configuration information for device-to-device communication between at least two customer premise equipment devices at the customer premise; and
   passing a message from the customer premise modem to one of the at least two customer premise equipment devices indicative of the device-to-device communication configuration information, configuring device-to-device communication between the at least two customer premise equipment devices at the customer premise in accordance with the device-to-device communication configuration indicated in the message,
   wherein the customer premise equipment includes a set-top box, and wherein the device-to-device communication configuration relates to physical layer or data link layer communications among set-top boxes, and
   wherein the set-top box and the customer premise modem are both embedded in a subscriber gateway.

2. The method of claim 1 wherein the customer premise modem has a hardware address, and wherein the device-to-device communication configuration indicated by information in the modem configuration file sent from the network server is based at least in part on the hardware address of the customer premise modem.

3. The method of claim 2 further comprising:
   establishing a plurality of device-to-device communication configurations;
   for a plurality of customer premise modem/customer premise equipment device pairs, including the customer premise modem, selecting a device-to-device communication configuration for each customer premise equipment device; and
   relating the device-to-device configuration for each customer premise equipment device to the hardware address of the customer premise modem in the respective pair.

4. The method of claim 1, wherein the configuration information includes electrical specifications for signals between the at least two customer premise equipment devices.

5. The method of claim 1, wherein the configuration information includes frame structure information for communication between the at least two customer premise equipment devices.

6. The method of claim 1, further comprising:
   filtering upstream communications to block upstream traffic towards the network server during the device-to-device communications between the at least two customer premise equipment devices.

7. The method of claim 6, wherein the filtering is performed using a data link layer filter.

8. The method of claim 6, wherein the filtering is performed using a physical layer filter.

9. A modem system, comprising:
   a modem communicatively coupled between a modem termination system and a plurality of customer premise equipment devices, wherein the modem is configured to
   (i) receive configuration information from the modem termination system, the configuration information including first configuration information for communications between the modem and the modem termination system, and second configuration information for local device-to-device communications between the customer premise equipment devices;
   (ii) configure itself for communication with the modem termination system according to the first configuration information; and
   (iii) forward the second configuration information to the plurality of customer premise equipment devices, and wherein at least one of the customer premise equipment devices is configured to receive the forwarded second configuration information, wherein the modem and the at least one of the customer premise equipment devices are embedded within a subscriber gateway,
   wherein, at least two customer premise equipment devices are configured to receive at least part of the forwarded second configuration information, and to configure themselves for device-to-device communication accordingly.

10. The system of claim 9, wherein the second configuration information includes physical or data link layer configuration information.

11. The system of claim 9, wherein the second configuration information identifies electrical characteristics for signals between the customer premise equipment devices.

12. The system of claim 9, wherein the second configuration information identifies a frame structure for communications between the customer premise equipment devices.

* * * * *